United States Patent
Lusser et al.

(10) Patent No.: US 12,092,150 B2
(45) Date of Patent: Sep. 17, 2024

(54) CONNECTING JOINT FOR CONNECTING COMPONENTS OF A LABORATORY AUTOMATION SYSTEM

(71) Applicant: Roche Diagnostics Operations, Inc., Indianapolis, IN (US)

(72) Inventors: Eugen Lusser, Alpnach Dorf (CH); Thomas Meyer, Walchwil (CH); Leon Felipe Apodaca Lujan, Markgroeningen (DE); Timo Gutmann, Bietgheim-Bissingen (DE); Avinash Addihalli Narayana, Stuttgart (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 454 days.

(21) Appl. No.: 17/453,977

(22) Filed: Nov. 8, 2021

(65) Prior Publication Data

US 2022/0196052 A1    Jun. 23, 2022

(30) Foreign Application Priority Data

Dec. 22, 2020 (EP) .................................. 20216535

(51) Int. Cl.
*F16B 7/18* (2006.01)
*G01N 35/00* (2006.01)

(52) U.S. Cl.
CPC ............. *F16B 7/187* (2013.01); *G01N 35/00* (2013.01)

(58) Field of Classification Search
CPC ... F16B 7/187; F16M 11/045; F16M 11/2092; F16M 13/02; F16M 2200/027;
(Continued)

(56) References Cited

U.S. PATENT DOCUMENTS 3,511,462 A    5/1970  de Bazignan
2003/0215357 A1*  11/2003  Malterer ............. G01N 35/028
                                                              422/50
(Continued)

FOREIGN PATENT DOCUMENTS

CN    106695232 A    5/2017
CN    109102842 A    12/2018
(Continued)

OTHER PUBLICATIONS

Changshu CN 106695232 translation to English (Year: 2024).*
European Search Report issued Jun. 10, 2021, in Application No. 20216535.3, 2 pp.

*Primary Examiner* — Jennifer Wecker
*Assistant Examiner* — Jonathan Bortoli
(74) *Attorney, Agent, or Firm* — Woodard, Emhardt, Henry, Reeves & Wagner, LLP (57) ABSTRACT

A connecting joint for adjustably connecting at least two components of a laboratory automation system is disclosed. The connecting joint comprises a horizontal bearing unit connectable to a first component of the at least two components of the laboratory automation system; a vertical bearing unit connectable to a second component of the at least two components of the laboratory automation system; and a slider bar connecting the horizontal bearing unit with the vertical bearing unit, wherein the slider bar is movably mounted along a vertical axis within the vertical bearing unit; and wherein the slider bar is adjustably mounted in the horizontal bearing unit, wherein the slider bar is adjustable in at least one dimension essentially perpendicular to the vertical axis by the horizontal bearing unit.

15 Claims, 4 Drawing Sheets

(58) Field of Classification Search
CPC .......... G01N 2035/00306; G01N 2035/00326; G01N 35/00; G12B 5/00
See application file for complete search history.

(56) References Cited

U.S. PATENT DOCUMENTS

2009/0004056 A1    1/2009   Clement
2021/0190805 A1*  6/2021   Pedrazzini ........... G01N 35/021

FOREIGN PATENT DOCUMENTS

| CN | 111001449 A | 4/2020 |
|----|-------------|--------|
| DE | 3615942 A1 | 11/1987 |
| DE | 3813477 C1 | 11/1989 |
| EP | 0024073 B1 | 8/1985 |
| EP | 3196652 A1 | 7/2017 |
| JP | 2007-209861 A | 8/2007 |
| WO | 1993/015407 A1 | 8/1993 |
| WO | 2001/013563 A1 | 2/2011 |
| WO | 2011/138448 A1 | 11/2011 |

* cited by examiner

CONNECTING JOINT FOR CONNECTING COMPONENTS OF A LABORATORY AUTOMATION SYSTEM

CROSS-REFERENCE TO RELATED APPLICATIONS

This application claims priority to European Patent Application No. 20216535.3, filed 22 Dec. 2020, the disclosure of which is hereby incorporated by reference in its entirety.

TECHNICAL FIELD

The present disclosure refers to a connecting joint for adjustably connecting at least two components of a laboratory automation system, a laboratory automation system, and to a method for adjustably connecting at least two components of a laboratory automation system. The connecting joint, the laboratory automation system and the method for adjustably connecting at least two components of a laboratory automation system may specifically be used in the field of medical or chemical laboratories, in particular for in vitro diagnostics (IVD). Other fields of application of the present disclosure, however, are feasible.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps or workflow steps on one or more biological samples and/or one or more reagents, such as pre-analytical instruments, post-analytical instruments, and analytical instruments.

Analytical instruments or analyzers are configured to obtain a measurement value. An analyzer is operable to determine via various chemical, biological, physical, optical or other technical procedures, a parameter value of the sample, or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites, and physical or chemical parameters of various types. An analytical instrument may comprise units assisting with the pipetting, dosing, and mixing of samples and/or reagents.

In the field of medical or chemical laboratories, a sample transport system may be used for distributing sample tubes between analytical instruments. The tubes may comprise a wide variety of samples, such as blood, blood serum or plasma, urine or chemical substances, and the tubes could also be of several types having different shapes, diameter, colors, heights, etc. The transport system may comprise a plurality of cavities for receiving sample tubes for delivering them to the respective analytical instruments.

An exemplary embodiment of a system for transporting containers between different stations is described in WO 2011/138448 A1. The containers are accommodated in container carriers. The system comprises a control unit, which controls the transportation of the container carriers, a transporting surface, which is subdivided into sub-surfaces and on which the container carriers can be arranged in a movable manner, and drive means. The drive means are activated by the control unit and one drive means in each case is assigned to one sub-surface in each case. A drive means in each case is designed in order to provide an associated container carrier with driving power.

EP 3 196 652 A1 describes a laboratory distribution system for use in a laboratory automation system with a number of diagnostic laboratory container carriers and a conveyor device. The conveyor device comprises an endless drive member, in particular a belt or a chain, defining a closed-loop conveyor pathway, and a number of supporting elements attached to the endless drive member, which supporting elements are adapted for receiving one diagnostic laboratory container carrier and for transporting said diagnostic laboratory container carrier in an upright position along at least a section of the conveyor pathway. The supporting elements are each mounted pivotally about a horizontal pivot axis to the drive member for maintaining the supporting elements in an upright use position while travelling along the conveyor path.

Typically, laboratory automation systems comprising one or more sample transport systems which may be used for distributing sample tubes between analytical instruments are largely dimensioned. Exemplarily, the laboratory automation system may have a length of 20 m to 40 m. For the purpose of achieving a horizontal alignment of the sample transport system and the analytical instruments, the laboratory automation system may comprise a plurality of adjustable feet to compensate differences in height. The differences in height may exemplary emerge from high differences of a floor on which the laboratory automation system is installed. Further, differences in height may result from a sinking of the adjustable feet into the ground. Thus, there is a need to further improve a horizontal alignment.

Several devices including positioning parts which can be adjustable in the vertical and horizontal directions are known. Thus, DE 3813 477 C1 describes an apparatus for holding an object in an essentially weightless state, having the following features: a carrier-device part with a constantly vertical axis, a positioning-device part, which is coupled to the carrier-device part and can be adjusted vertically in relation to the carrier-device part, and moreover can be displaced in a horizontal plane, and it also exhibits a load-bearing securing means for attaching the object, a constantly horizontal, first linear guide part, for the horizontal adjustment of the load-bearing securing means in relation to the carrier-device part, and a constantly horizontal axis about which the object can rotate.

U.S. Pat. No. 3,511,462 A describes a device for supporting and centering optical components which comprises two supports carried by two arms adapted to slide in a frame and situated opposite one another at a regulatable distance according to the length of optical component. The first support consists of two concentric rings arranged as a universal joint and the second support consists of a floating ring cooperating with two shanks fast with micrometer screws which can be displaced in translational movement in two non-parallel directions. The optical component is locked in position by means of a screw in the central ring and by means of an element such as a screw in ring. The ring is pressed by spring against friction shoes or ball bearings on the end of shanks. The frame can slide in direction Y on a support which itself slides on a base in direction Z, the base being also capable of pivotal movement about a pivot pin.

EP 0024073 A1 describes the precise adjustment in the three spatial directions which is obtained with the aid of an operating member consisting of a handle, the rotation of which acts by a gimbal on the parts of the base which are used to move the instrument in height, and into an internal lever which, when the actuator is tilted around the center of rotation defined by the gimbal is connected without play to the handle and thus produces the horizontal displacement of the base relative to the base. The internal lever is housed, so as to be able to swing in all directions, in a socket fixed to the base and its lower end in the form of a spherical foot which rests directly on the base. The socket in which the internal lever houses is arranged in or near the plane of the gimbal; the radius of the spherical foot corresponds to the distance between the socket and the base.

CN 109102842 A describes a two-dimensional plane translation adjusting device, which comprises an outer frame, a middle frame and an inner frame. The top wall and the left wall of the outer frame are provided with a screw hole I and a screw hole II, respectively, and the right wall of the outer frame is provided with a through hole I. The center of the top of the outer frame is provided with a vertical adjustment top wheel matched with the top wall of the inner frame, and a horizontal adjustment top wheel matched with the outer wall of the middle frame is arranged at the center of the right wall of the outer frame. The outer frame sleeves the middle frame, and the middle of the top wall of the middle frame is provided with a through hole II matched with the vertical adjustment top wheel at the center of the top of the outer frame. A screw hole III and a screw hole IV arranged in the right wall and the bottom wall of the middle frame, respectively, and the bottom wall of the outer frame is provided with a guiding groove. The two-dimensional plane translation adjusting device disclosed by the disclosure is simple in structure, and convenient and quick to operate, effectively reduces the friction coefficient of movement at the vertical direction and the horizontal direction movement, and ensures smoothness and no sticking during the movement.

Despite the advantages achieved by the known methods and devices several technical challenges remain. Specifically, an alignment of a device which extends over several meters remains a technical challenge. Connected devices may move in a vertical axis or may sink at different rates during operation of the device. Thus, there is a need for a device which compensates high differences which emerge after installation and over longer time periods. Further, a realization of a twist-proof configuration remains a technical challenge.

It is therefore desirable to provide a connecting joint for adjustably connecting at least two components of a laboratory automation system, a laboratory automation system and to a method for adjustably connecting at least two components of a laboratory automation system that at least partially address the above-mentioned technical challenges of known methods and devices of similar kind. Specifically, a connecting joint for adjustably connecting at least two components of a laboratory automation system and a method for adjustably connecting at least two components of a laboratory automation system are described herein that improve an alignment of a laboratory automation system, and a laboratory automation system with an improved alignment is further disclosed.

SUMMARY

Although the embodiments of the present disclosure are not limited to specific advantages or functionality, it is noted that in accordance with the present disclosure a connecting joint for adjustably connecting at least two components of a laboratory automation system, a laboratory automation system and to a method for adjustably connecting at least two components of a laboratory automation system with the features of the independent claims are provided. Advantageous embodiments which might be realized in an isolated fashion or in any arbitrary combinations are listed in the dependent claims as well as throughout the specification.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

Further optional features and embodiments will be disclosed in more detail in the subsequent description of embodiments, typically in conjunction with the dependent claims. Therein, the respective optional features may be realized in an isolated fashion as well as in any arbitrary feasible combination, as the skilled person will realize. The scope of the disclosure is not restricted by the typical embodiments. The embodiments are schematically depicted in the figures. Therein, identical reference numbers in these figures refer to identical or functionally comparable elements.

The following detailed description of the embodiments of the present description can be best understood when read in conjunction with the following drawings, where like structure is indicated with like reference numerals and in which.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

In a first aspect of the present disclosure, a connecting joint for adjustably connecting at least two components of a laboratory automation system is disclosed. The connecting joint comprises a horizontal bearing unit connectable to a first component of the at least two components of the laboratory automation system. Further, the connecting joint comprises a vertical bearing unit connectable to a second component of the at least two components of the laboratory automation system. Further, the connecting joint comprises a slider bar connecting the horizontal bearing unit with the vertical bearing unit. The slider bar is movably mounted along a vertical axis within the vertical bearing unit. The slider bar is adjustably mounted in the horizontal bearing unit. The slider bar is adjustable in at least one dimension essentially perpendicular to the vertical axis by the horizontal bearing unit.

The term "laboratory" as used herein is a broad term and is to be given its ordinary and customary meaning to a person of ordinary skill in the art and is not to be limited to a special or customized meaning. The term specifically may refer, without limitation, to at least one environment comprising at least one instrument configured for preparing and/or analyzing at least one sample, such as a test sample, e.g., a chemical sample and/or a biological sample. Specifically, the sample may be contained in at least one container such as a sample tube. The laboratory may be a location configured for work in the field of the natural sciences and/or engineering in the sense that it offers the opportunity to conduct corresponding measurements and controls.

The term "laboratory automation system" as used herein is a broad term and is to be given its ordinary and customary meaning to a person of ordinary skill in the art and is not to be limited to a special or customized meaning. The term specifically may refer, without limitation, to a system which is configured for handling samples automatically. Specifically, the laboratory automation system may be configured for processing samples, specifically samples contained in a container such as sample tubes in which samples are enclosed autonomously and/or fully or partially automatically. The laboratory automation system, as an example, may comprise at least one laboratory distribution system, such as an actuator, configured for transferring the at least one sample from one position to another position. The laboratory automation system may further comprise one or more handling stations for handling and/or processing one or more of the samples. The laboratory automation system may further comprise at least one laboratory station for sample analysis.

A laboratory in which the laboratory automation system is used may be, for example, a medical laboratory, such as a clinical laboratory, a forensic laboratory, or a blood bank. Further, the laboratory in which the laboratory automation system is used may be a chemical laboratory, such as an analytic laboratory. Also, other applications may be feasible.

For exemplary embodiments of laboratory systems which may also be used in the context of the present disclosure, with the modifications as discussed herein, reference may be made, e.g., to WO 2011/138448 A1. Other laboratory systems, however, may also be used.

The term "component" as used herein is a broad term and is to be given its ordinary and customary meaning to a person of ordinary skill in the art and is not to be limited to a special or customized meaning. The term specifically may refer, without limitation, to a part of a mechanical and/or mechatronical system. The component may be handled independently or may be coupled, connectable or integratable in order to fulfill at least one common function. The terms "first component" and "second component" may be considered as nomenclature only, without numbering or ranking the named elements, without specifying an order and without excluding a possibility that several kinds of first components and second components may be present. Further, additional components such as one or more third components may be present.

The first component may be a laboratory station of the laboratory automation system and the second component may be a laboratory distribution system of the laboratory automation system or vice versa. Thus, the first component may be the laboratory distribution system of the laboratory automation system and the second component may be the laboratory station of the laboratory automation system. Further details on the laboratory station and the laboratory distribution system are given below.

The term "connecting joint" as used herein is a broad term and is to be given its ordinary and customary meaning to a person of ordinary skill in the art and is not to be limited to a special or customized meaning. The term specifically may refer, without limitation, to an arbitrary element which is configured for forming a mechanical coupling between at least two physical objects. Thus, at least one first physical object may be mechanically coupled to at least one second physical object via the element. Specifically, the element may be mechanically connectable to the first physical object and the element may be mechanically connectable to the second physical object. The mechanical connection specifically may be selected from the group consisting of: an interlocking connection, a frictional connection, a substance-to-substance bond. Thus, the element may be configured for restricting a mobility between the first physical object and the second physical object.

The connecting joint may be configured for adjustably connecting the at least two components. The term "configured for adjustably connecting" as used herein is a broad term and is to be given its ordinary and customary meaning to a person of ordinary skill in the art and is not to be limited to a special or customized meaning. The term specifically may refer, without limitation, to a property of an arbitrary joint of being configured for restricting a mobility between at least two physical objects in an adaptable matter. Thus, a relative position of a first physical object to the second physical object may be adaptable via the joint. Specifically, the relative position of the first physical object to the second physical object may be changeable by a rotational movement and/or a translational movement of one of the first physical object and the second physical object relative to the other physical object via the joint. Specifically, the joint may be configured for forming a mechanical connection to the first physical object and to the second physical object, respectively, and, thereafter, the relative position of the first physical object to the second physical object may be adjusted. Exemplarily, the joint may have at least two parts which are translationally and/or rotationally moveable relative to each other.

As outlined above, the connecting joint comprises the horizontal bearing unit and the vertical bearing unit. The term "unit" as used herein is a broad term and is to be given its ordinary and customary meaning to a person of ordinary skill in the art and is not to be limited to a special or customized meaning. The term specifically may refer, without limitation, to an arbitrary element being configured to interact with another element in order to fulfill at least one common function. Specifically, the elements may be coupled to each other, connectable to each other or integratable into each other in order to form a common component. Thus, the unit may also be referred to as part or as component.

The term "bearing unit" as used herein is a broad term and is to be given its ordinary and customary meaning to a person of ordinary skill in the art and is not to be limited to a special or customized meaning. The term specifically may refer, without limitation, to an arbitrary device or component which is configured for carrying and/or supporting at least one further device or component. The bearing unit specifically may be configured for constraining a relative motion between at least two physical objects to only a desired motion between the physical objects. Further, the component may be configured for reducing friction between the physical objects. The bearing unit may be configured for preventing a motion by controlling one or more vectors of normal forces that bear on the physical objects.

The term "vertical bearing unit" as used herein is a broad term and is to be given its ordinary and customary meaning to a person of ordinary skill in the art and is not to be limited to a special or customized meaning. The term specifically may refer, without limitation, to an arbitrary bearing unit which is configured for enabling a movement between at least two physical objects in a vertical axis. The vertical axis may correspond to an axis z and may be arranged perpendicular to the axes x and y as defined above.

The term "vertical axis" as used herein is a broad term and is to be given its ordinary and customary meaning to a person of ordinary skill in the art and is not to be limited to a special or customized meaning. The term specifically may refer, without limitation, to a property of an axis of standing perpendicular to a horizontal level of a system such as the laboratory automation system, and/or to the level surfaces of the earth's gravity field in the direction of the resultant from the earth's gravitation and the centrifugal force due to the earth's rotation.

The term "horizontal bearing unit" as used herein is a broad term and is to be given its ordinary and customary meaning to a person of ordinary skill in the art and is not to be limited to a special or customized meaning. The term specifically may refer, without limitation, to an arbitrary bearing unit which is configured for enabling a movement between at least two physical objects in a horizontal plane. The horizontal plane may exemplarily extend along an axis x and an axis y which are arranged perpendicular to each other.

The term "horizontal plane" as used herein is a broad term and is to be given its ordinary and customary meaning to a person of ordinary skill in the art and is not to be limited to a special or customized meaning. The term specifically may refer, without limitation, to a plane parallel to a horizontal working surface in a system such as the laboratory automation system. Thus, the horizontal plane is perpendicular to the vertical axis as defined above.

As outlined above, the horizontal bearing unit is connectable to the first component and the vertical bearing unit is connectable to the second component. The term "connectable to a component" as used herein is a broad term and is to be given its ordinary and customary meaning to a person of ordinary skill in the art and is not to be limited to a special or customized meaning. The term specifically may refer, without limitation, to a property of an element of being mechanically couplable to an arbitrary component. Thus, the element and the component may have a mechanical connection. The mechanical connection may be selected from the group consisting of: an interlocking connection, a frictional connection, a substance-to-substance bond. Also other embodiments may be feasible. Further details on the mechanical connection between the horizontal bearing unit and the first component and on the mechanical connection between the vertical bearing unit and the second component are given below in more detail.

Specifically, the horizontal bearing unit may be fixedly connectable to the first component of the at least two components of the laboratory automation system. The term "being fixedly connectable" as used herein is a broad term and is to be given its ordinary and customary meaning to a person of ordinary skill in the art and is not to be limited to a special or customized meaning. The term specifically may refer, without limitation, to a property of an object of being of an element of being mechanically couplable to an arbitrary component such that a movement of the element relative to the component is suppressed completely or at least to a large extent. Specifically, the horizontal bearing unit may be fixedly connectable to the first component of the at least two components of the laboratory automation system by a force-fit connection. Thus, the horizontal bearing unit and the first component may be pressed together and may stay in their position by static friction. Specifically, the horizontal bearing unit may comprise one or more connecting elements, specifically one or more through holes, for fixedly connecting the horizontal bearing unit to the first component. The horizontal bearing unit may further comprise one or more screws. The horizontal bearing unit may configured to be screwed to the first component.

The horizontal bearing unit may comprise at least one first part having at least one first linear guide, typically at least one first elongated hole, and at least one second part having at least one second linear guide, typically at least one second elongated hole. The terms "first part", "first linear guide", "first elongated hole", as well as "second part", "second linear guide", "second elongated hole" may be considered as nomenclature only, without numbering or ranking the named elements, without specifying an order and without excluding a possibility that several kinds of first parts, first linear guides and first elongated holes as well as second parts, second linear guides and second elongated holes may be present. Further, additional parts, linear guides and elongated holes such as one or more third parts, third linear guides and third elongated holes may be present.

The first linear guide may have a length of 1 mm to 100 mm, typically of 5 mm to 20 mm, most typically of 15 mm. The second linear guide may have a length of 10 mm to 100 mm, typically of 20 mm to 50 mm, typically of 25 mm to 35 mm, most typically of 30 mm.

The first part and the second part may be arranged essentially perpendicular to each other. The term "essentially perpendicular" may comprise slight deviations from a perpendicular arrangement such as arrangements that deviate from a perpendicular arrangement by no more than 10 degrees, typically by no more than 5 degrees. Specifically, the first linear guide and the second linear guide may be arranged essentially perpendicular to each other. Specifically, the first part and the second part, specifically the first linear guide and the second linear guide, may be arranged in a T-configuration to each other.

The term "linear guide" as used herein is a broad term and is to be given its ordinary and customary meaning to a person of ordinary skill in the art and is not to be limited to a special or customized meaning. The term specifically may refer, without limitation, to an arbitrary element being designed to provide free motion in one direction. Specifically, it is referred to an element with the help of which a component can be moved against on a straight line. As outlined above, the linear guide may specifically be an elongated hole. The elongated hole may be a through hole.

Specifically, the first part and the second part may be adjustably mounted on each other. Thus, a position of the first part relative to the second part may be adaptable. Specifically, the position of the first part relative to the second part may be adjustable along an axis defined by the second linear guide. The first part may be configured to be screwed to the second part via one or more screws, specifically via at least two screws. The screws may be received at least partially in the second linear guide of the second part. In a first state, the screws may be loosely screwed to the first part and the first part may be movable along the axis defined by the second linear guide. In a second state, specifically when a desired position of the first part and the second part relative to each other is adjusted, the screws may be screwed down, specifically such that a relative movement of the first part to the second part may be suppressed or at least reduced to a large extent. As outlined above, the first part may be configured to be screwed to the second part specifically via at least two screws. Due to the utilization of at least two screws, a twisting of the first part and the second part relative to each other may be suppressed or at least reduced to a large extent.

The vertical bearing unit may comprise at least one slide bearing. The term "slide bearing" as used herein is a broad term and is to be given its ordinary and customary meaning to a person of ordinary skill in the art and is not to be limited to a special or customized meaning. The term specifically may refer, without limitation, to an arbitrary bearing having at least one bearing surface. A shaft may be configured for being in contact with the bearing surface and for sliding over the bearing surface. Specifically, the slide bearing may comprise at least one bearing bore. The bearing bore may be configured for partially receiving the slider bar. The bearing bore may comprise at least one bearing surface. The bearing surface may be configured for being in contact with the slider bar.

Specifically, the vertical bearing unit may be fixedly connectable to the second component of the at least two components of the laboratory automation system. Specifically, vertical bearing unit may be fixedly connectable to the second component of the at least two components of the laboratory automation system by a force-fit connection. Specifically, the vertical bearing unit may comprise one or more connecting elements, specifically one or more eyelets, for fixedly connecting the vertical bearing unit to the second component. The vertical bearing unit may further comprise one or more screws. The vertical bearing unit may configured to be screwed to the second component.

The term "slider bar" as used herein is a broad term and is to be given its ordinary and customary meaning to a person of ordinary skill in the art and is not to be limited to a special or customized meaning. The term specifically may refer, without limitation, to an arbitrary longitudinal element which is configured to perform a sliding movement from one position to at least another position and vice versa. The slider bar may comprise at least one cylindrically shaped portion, specifically at least one circular cylindrically shaped portion. Specifically, the cylindrically shaped portion may be at least partially received in the vertical bearing unit. Further, the slider bar may comprise at least one first end and at least one opposing second end. At least one of the first end, the second end may be conically shaped.

The slider bar may have a length of 5 mm to 100 mm, typically of 10 mm to 70 mm, most typically of 20 mm to 40 mm. A distance between the first part of the horizontal bearing unit and the second component of the laboratory automation system may be 10 mm to 100 mm, typically of 20 mm to 50 mm, typically of 25 mm to 35 mm, most typically of 30 mm.

As outlined above, the slider bar connects the horizontal bearing unit with the vertical bearing unit. Thus, the slider bar may form a mechanical coupling between the horizontal bearing unit and the vertical bearing unit. Specifically, the slider bar may be mechanically connectable to horizontal bearing unit. Further, the slider bar may be mechanically connectable to the vertical bearing unit. Further details on the connection between the slider bar and the horizontal bearing unit as well as on the connection between the slider bar and the vertical bearing unit are given below in more detail.

As outlined above, the slider bar is movably mounted along a vertical axis within the vertical bearing unit. Specifically, the slider bar may be arrangeable along the vertical axis. The slider bar may be arrangeable along the vertical axis. The term "movably mounted" as used herein is a broad term and is to be given its ordinary and customary meaning to a person of ordinary skill in the art and is not to be limited to a special or customized meaning. The term specifically may refer, without limitation, to a state of an object of being capable of performing a movement in at least one direction in a mounted state. The movement may specifically refer to a sliding movement. The term "movably mounted along an axis" as used herein is a broad term and is to be given its ordinary and customary meaning to a person of ordinary skill in the art and is not to be limited to a special or customized meaning. The term specifically may refer, without limitation, to a state of an object of being capable of performing a movement along an axis in a mounted state. Thus, the object may be capable of performing a movement in a direction defined by the axis. The slider bar may be slidably mounted along the vertical axis within the vertical bearing unit. Specifically, the slider bar may be slidably mounted in the bearing bore of the slide bearing.

As outlined above, the slider bar is adjustably mounted in the horizontal bearing unit. The term "adjustably mounted" as used herein is a broad term and is to be given its ordinary and customary meaning to a person of ordinary skill in the art and is not to be limited to a special or customized meaning. The term specifically may refer, without limitation, to a property of an object of being mounted, wherein a position of the object is adaptable. Specifically, the object may be arrangeable relative to another object in a desired position.

As outlined above, the slider bar is adjustable, e.g., arrangeable in a desired position, in at least one dimension essentially perpendicular to the vertical axis by the horizontal bearing unit. The term "essentially perpendicular" as used herein is a broad term and is to be given its ordinary and customary meaning to a person of ordinary skill in the art and is not to be limited to a special or customized meaning. The term specifically may refer, without limitation, to the fact that a perpendicular orientation is typical. However, slight deviations from a perpendicular orientation may be feasible, such as orientations that deviate from a perpendicular orientation by no more than 10 degrees, typically by no more than 5 degrees.

A position of the slider bar relative to the first part may be adjustable along an axis defined by the first linear guide. The slider bar may be configured to be screwed to the first part of the horizontal bearing unit via one or more screws. The screw may be received at least partially in the first linear guide of the first part. In a first state, the screws may be loosely screwed to the slider bar and the slider bar may be movable along the axis defined by the first linear guide. In a second state, specifically when a desired position of the slider bar and the first part relative to each other is adjusted, the screws may be screwed down, specifically such that a relative movement of the slider bar to the first part may be suppressed or at least reduced to a large extent. One end of the slider bar unit may be partially received in the first linear guide, specifically in the first elongated hole. Due to this arrangement, a twisting of the slider bar transverse to the axis defined by the first linear guide may be suppressed or at least reduced to a large extent.

The slider bar may be fixedly mounted in an adjustable position in the at least one dimension perpendicular to the vertical axis in the horizontal bearing unit. The term "fixedly mounted" as used herein is a broad term and is to be given its ordinary and customary meaning to a person of ordinary skill in the art and is not to be limited to a special or customized meaning. The term specifically may refer, without limitation, to a property of an object of being mounted, wherein a movement of the object relative to another object is suppressed or at least reduced to a large extent.

One or more of the slider bar, the vertical bearing unit, the horizontal bearing unit, further components of the mechanical joint, may be made of at least one material selected from the group consisting of: steel, specifically stainless steel; brass; aluminum; a composite material; a polymer. Also other materials may be feasible.

In a further aspect of the present disclosure, a laboratory automation system is disclosed. The laboratory automation system comprises a plurality of laboratory stations. Further, the laboratory automation system comprises at least one laboratory distribution system. The laboratory distribution system is configured to distribute laboratory cargo between the laboratory stations. Further, the laboratory automation system comprises at least one connecting joint as described above or as will further be described below in more detail. The connecting joint connects at least one of the laboratory stations to the laboratory distribution system.

The term "laboratory station" as used herein is a broad term and is to be given its ordinary and customary meaning to a person of ordinary skill in the art and is not to be limited to a special or customized meaning. The term specifically may refer, without limitation, to a device which, as a component of the laboratory system as defined above, is configured for performing at least one laboratory task or step in the laboratory system, such as at least one task selected from the group consisting of a sample preparation and a sample analysis. Specifically, the laboratory system may be configured for analyzing the at least one sample, in particular a plurality of samples, and/or for performing at least one step in a process chain of sample analysis, e.g., at least one of a biological step, a chemical step and an analytical step. Thus, the samples to be analyzed may be prepared for the analysis using at least one reagent. Specifically, the laboratory analyzer may be used for electrochemical and/or spectroscopic experiments. The laboratory station may be used in the field of medical or chemical laboratories, in particular for in vitro diagnostics (IVD). The laboratory station may be configured for executing one or more processing steps and/or workflow steps on one or more biological samples and/or reagents. The term "processing step" thereby refers to physically executed processing steps such as centrifugation, aliquotation, sample analysis and the like. The laboratory station may be a pre-analytical, an analytical and/or a post-analytical station. Also other embodiments may be feasible. The "laboratory station" may also be referred to or be configured as a "laboratory analyzer", an "analytical station", an "analyzing instrument" or an "analytical system".

The term "laboratory distribution system" as used herein is a broad term and is to be given its ordinary and customary meaning to a person of ordinary skill in the art and is not to be limited to a special or customized meaning. The term specifically may refer, without limitation, to any device configured to hold one or more laboratory cargo and for distributing laboratory cargo to a target destination within the laboratory automation system, specifically via a conveying or transport line. The laboratory distribution system can be used in order to distribute laboratory cargo between the laboratory stations and other equipment. The laboratory distribution system may be or may comprise one or more of: at least one robot arm, a conveying system, a carrousel. Other laboratory distribution systems such as transport modules are known and may be used. The "laboratory distribution system" may also be referred to as a "laboratory transport system".

The term "laboratory cargo" as used herein is a broad term and is to be given its ordinary and customary meaning to a person of ordinary skill in the art and is not to be limited to a special or customized meaning. The term specifically may refer, without limitation, to an arbitrary laboratory diagnostic container, such as a vessel or a tube, configured for one or more of containing, storing or transporting a sample. The sample may refer to an aliquot of a substance such as a chemical or biological compound. Specifically, the sample may be or may comprise at least one biological specimen, such as one or more of: blood; blood serum; blood plasma; urine; saliva. Additionally or alternatively, the laboratory cargo and/or the sample may be or may comprise a chemical substance or compound and/or a reagent. Also other embodiments may be feasible.

One of the laboratory stations may be connected to the laboratory distribution system via at least two of the connecting joints. Due to the usage of at least two of the connecting joints a twisting of the laboratory distribution system and the laboratory station relative to each other may be suppressed or at least reduced to a large extent.

In a further aspect of the present disclosure, a method for adjustably connecting at least two components of a laboratory automation system is disclosed.

The method comprises the following steps which specifically may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:
i. providing at least one connecting joint as described above or as will further be described below in more detail;
ii. connecting the horizontal bearing unit to the first component of the at least two components of the laboratory automation system; and
iii. connecting the vertical bearing unit to the second component of the at least two components of the laboratory automation system.

The first component of the at least two components may be a laboratory station of the laboratory automation system. The second component of the at least two components may be a laboratory distribution system of the laboratory automation system. The laboratory station, the laboratory distribution system and the laboratory automation system are described in further detail and will further be described below in more detail.

The method may comprise adjustably mounting the slider bar in the horizontal bearing unit. Further, the method may comprise adjusting the slider bar in at least one dimension essentially perpendicular to the vertical axis via the horizontal bearing unit.

The devices and method show advantages over known devices and methods. An alignment of a device which extends over several meters may be realized. During installation of the laboratory automation system, specifically of the laboratory stations on the laboratory distribution system, an adjustment in the horizontal plane may be achieved. Specifically, once the adjustment is realized, the axes defining the horizontal plane may be fixed. Further, during operation of the laboratory automation system, a mobility in the vertical axis may be given. Commonly, the connected devices may move in a vertical axis or may sink at different rates during operation of the device. Due to the connecting joint according to the present disclosure, high differences which emerge after installation and over longer time periods may be compensated. Further, a twist-proof configuration may be achieved.

Summarizing and without excluding further possible embodiments, the following embodiments may be envisaged:

Embodiment 1: A connecting joint for adjustably connecting at least two components of a laboratory automation system, the connecting joint comprising:
a horizontal bearing unit connectable to a first component of the at least two components of the laboratory automation system;
a vertical bearing unit connectable to a second component of the at least two components of the laboratory automation system; and
a slider bar connecting the horizontal bearing unit with the vertical bearing unit,
wherein the slider bar is movably mounted along a vertical axis within the vertical bearing unit; and
wherein the slider bar is adjustably mounted in the horizontal bearing unit, wherein the slider bar is adjustable in at least one dimension essentially perpendicular to the vertical axis by the horizontal bearing unit.

Embodiment 2: The connecting joint according to the preceding embodiment, wherein the slider bar is slidably mounted along the vertical axis within the vertical bearing unit.

Embodiment 3: The connecting joint according to any one of the preceding embodiments, wherein the vertical bearing unit comprises at least one slide bearing.

Embodiment 4: The connecting joint according to the preceding embodiment, wherein the slide bearing comprises at least one bearing bore, wherein the bearing bore is configured for partially receiving the slider bar.

Embodiment 5: The connecting joint according to the preceding embodiment, wherein the slider bar is slidably mounted in the bearing bore of the slide bearing.

Embodiment 6: The connecting joint according to any one of the preceding embodiments, wherein the vertical bearing unit is fixedly connectable to the second component of the at least two components of the laboratory automation system.

Embodiment 7: The connecting joint according to any one of the preceding embodiments, wherein the vertical bearing unit comprises one or more connecting elements, specifically one or more eyelets, for fixedly connecting the vertical bearing unit to the second component.

Embodiment 8: The connecting joint according to any one of the preceding embodiments, wherein the slider bar is arrangeable along the vertical axis.

Embodiment 9: The connecting joint according to any one of the preceding embodiments, wherein the slider bar comprises at least one cylindrically shaped portion, specifically at least one circular cylindrically shaped portion.

Embodiment 10: The connecting joint according to the preceding embodiments, wherein the cylindrically shaped portion is at least partially received in the vertical bearing unit.

Embodiment 11: The connecting joint according to any one of the preceding embodiments, wherein the slider bar comprises at least one first end and at least one opposing second end, wherein at least one of the first end, the second end is conically shaped.

Embodiment 12: The connecting joint according to any one of the preceding embodiments, wherein the slider bar is fixedly mounted in an adjustable position in the at least one dimension perpendicular to the vertical axis in the horizontal bearing unit.

Embodiment 13: The connecting joint according to any one of the preceding embodiments, wherein the horizontal bearing unit is fixedly connectable to the first component of the at least two components of the laboratory automation system.

Embodiment 14: The connecting joint according to any one of the preceding embodiments, wherein the horizontal bearing unit comprises one or more connecting elements, specifically one or more through holes, for fixedly connecting the horizontal bearing unit to the first component.

Embodiment 15: The connecting joint according to any one of the preceding embodiments, wherein the horizontal bearing unit comprises at least one first part having at least one first linear guide, typically at least one first elongated hole, and at least one second part having at least one second linear guide, typically at least one second elongated hole.

Embodiment 16: The connecting joint according to the preceding embodiment, wherein the first part and the second part, specifically the first linear guide and the second linear guide, are arranged essentially perpendicular to each other.

Embodiment 17: The connecting joint according to any one of the two preceding embodiments, wherein the first part and the second part, specifically the first linear guide and the second linear guide, are arranged in a T-configuration to each other.

Embodiment 18: The connecting joint according to any one of the three preceding embodiments, wherein the first part and the second part are adjustably mounted on each other.

Embodiment 19: The connecting joint according to any one of the four preceding embodiments, wherein a position of the first part relative to the second part is adjustable along an axis defined by the second linear guide.

Embodiment 20: The connecting joint according to any one of the five preceding embodiments, wherein a position of the slider bar relative to the first part is adjustable along an axis defined by the first linear guide.

Embodiment 21: The connecting joint according to any one of the six preceding embodiments, wherein one end of the slider bar unit is partially received in the first linear guide, specifically in the first elongated hole.

Embodiment 22: The connecting joint according to any one of the preceding embodiments, wherein the first component is a laboratory station of the laboratory automation system and wherein the second component is a laboratory distribution system of the laboratory automation system or vice versa.

Embodiment 23: A laboratory automation system, comprising:
a plurality of laboratory stations;
at least one laboratory distribution system, wherein the laboratory distribution system is configured to distribute laboratory cargo between the laboratory stations; and
at least one connecting joint according to any one of the preceding claims, the connecting joint connecting at least one of the laboratory stations to the laboratory distribution system.

Embodiment 24: The laboratory automation system according to the preceding embodiment, wherein one of the laboratory stations is connected to the laboratory distribution system via at least two of the connecting joints.

Embodiment 25: A method for adjustably connecting at least two components of a laboratory automation system, the method comprising the following steps:
providing at least one connecting joint according to any one of the preceding embodiments referring to a connecting joint;
connecting the horizontal bearing unit to the first component of the at least two components of the laboratory automation system; and
connecting the vertical bearing unit to the second component of the at least two components of the laboratory automation system.

Embodiment 26: The method according to the preceding embodiment, wherein the first component of the at least two components is a laboratory station of the laboratory automation system, wherein the second component of the at least two components is a laboratory distribution system of the laboratory automation system.

Embodiment 27: The method according to any one of the two preceding embodiments, wherein the method comprises adjustably mounting the slider bar in the horizontal bearing unit.

Embodiment 28: The method according to any one of the tree preceding embodiments, wherein the method comprises adjusting the slider bar in at least one dimension essentially perpendicular to the vertical axis via the horizontal bearing unit.

In order that the embodiments of the present disclosure may be more readily understood, reference is made to the following examples, which are intended to illustrate the disclosure, but not limit the scope thereof.

Figure 1:
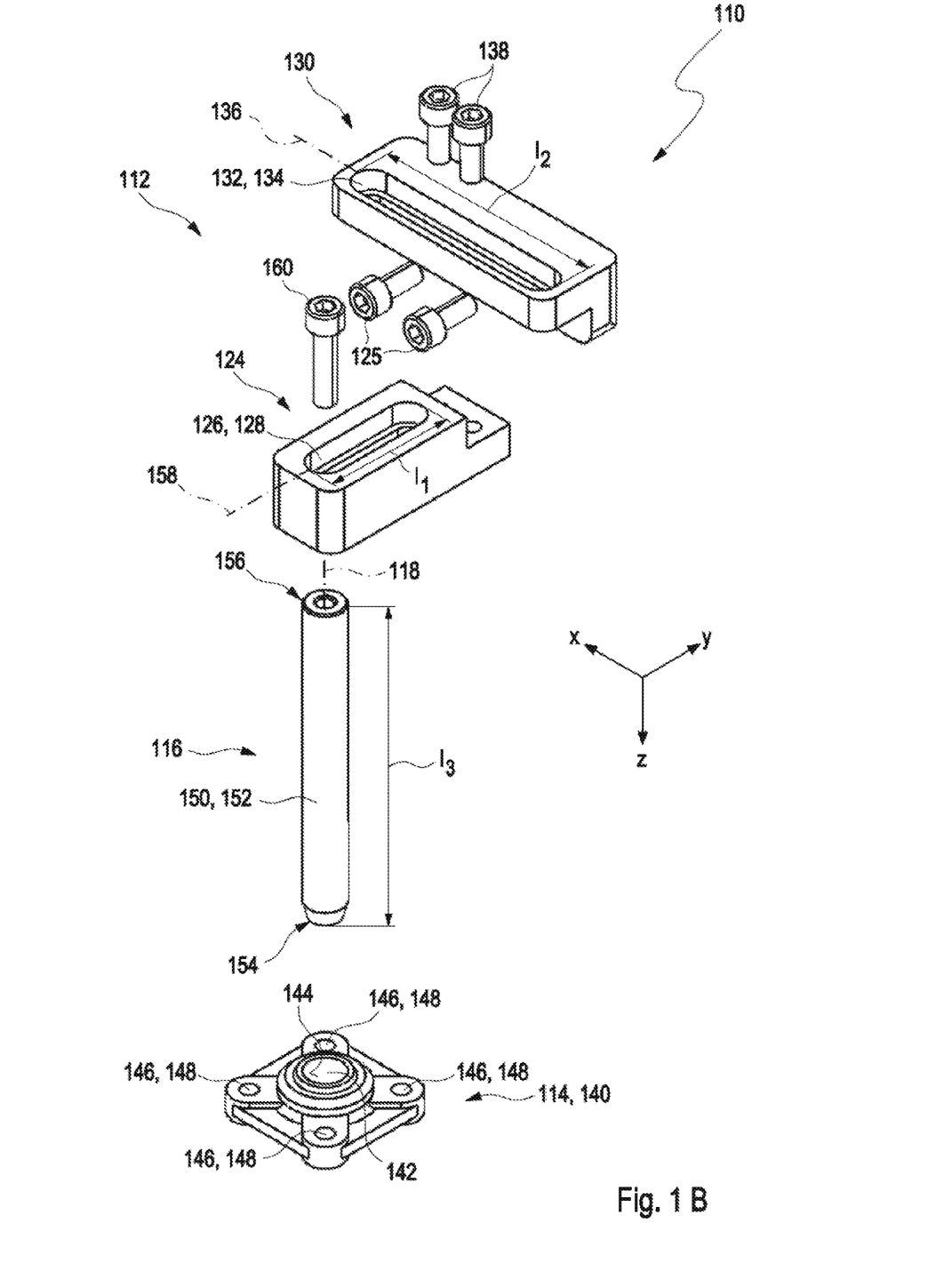
FIGS. 1A and 1B show an exemplary embodiment of a connecting joint in an assembled state (FIG. 1A) and in an exploded view (FIG. 1B) according to the present disclosure.
Figure 1A:
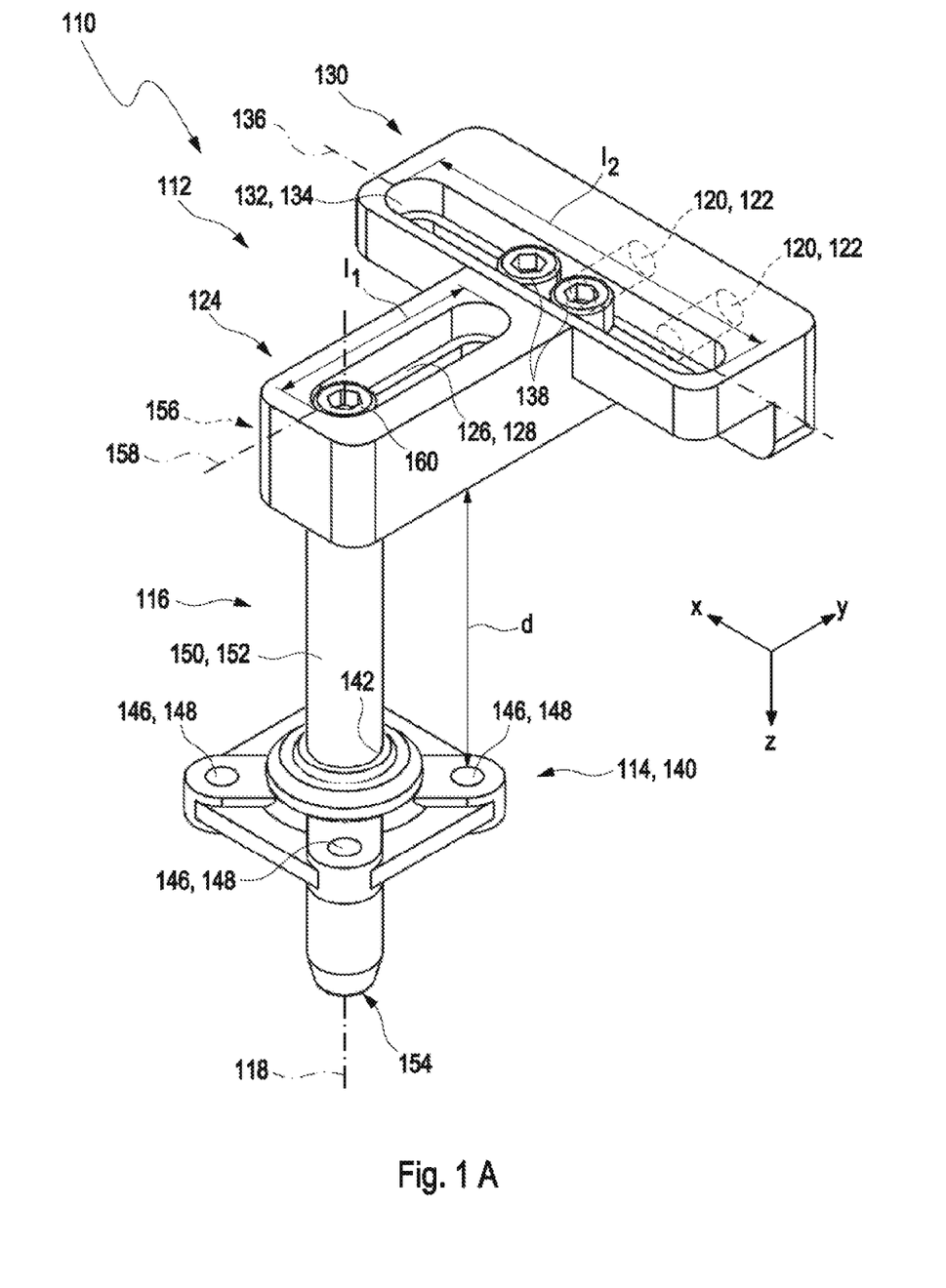

FIGS. 1A and 1B show an exemplary embodiment of a connecting joint 110 in an assembled state (FIG. 1A) and in an exploded view (FIG. 1B) according to the present disclosure.

Figure 2A:
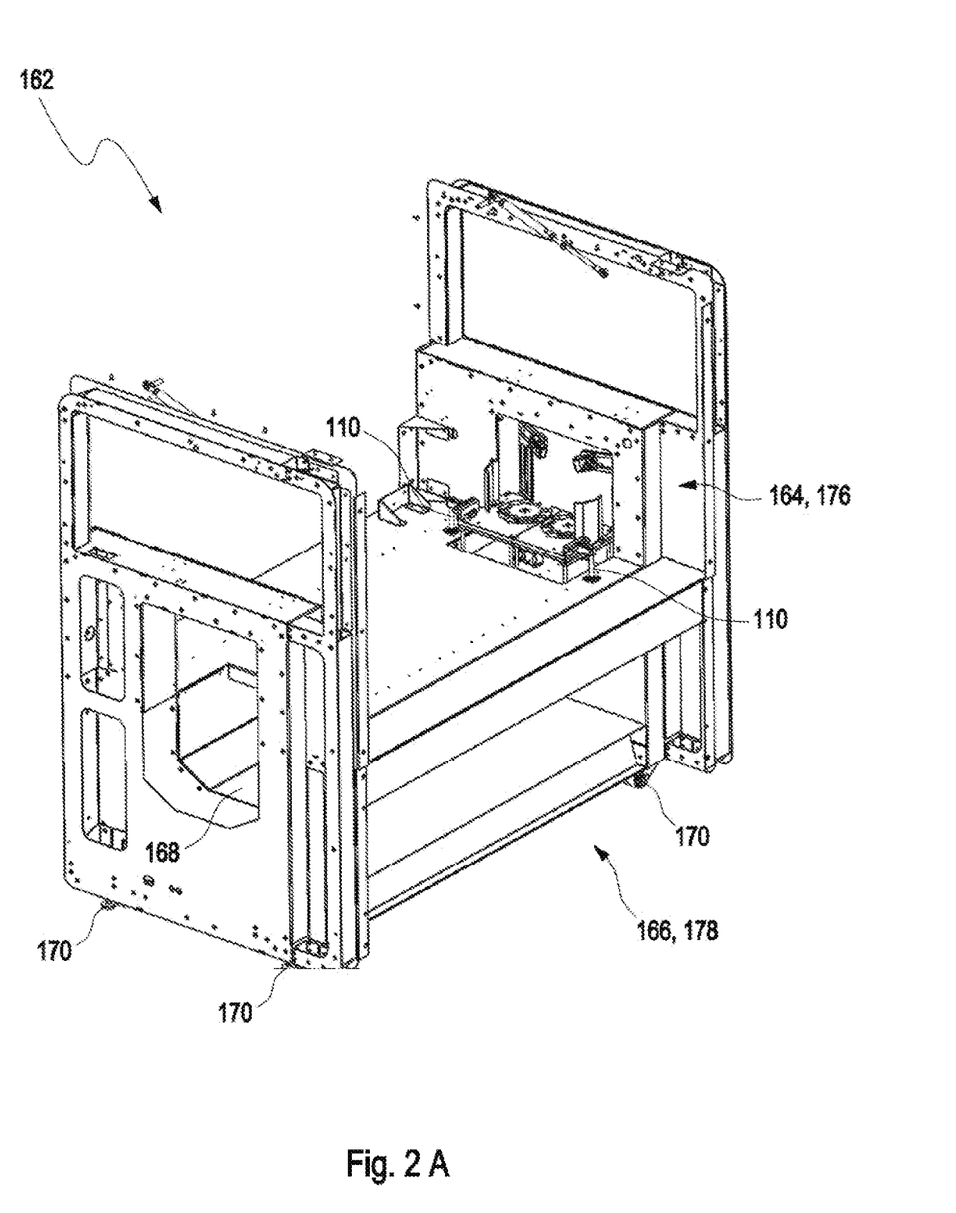
FIGS. 2A and 2B show an exemplary embodiment of a laboratory automation system in a perspective view (FIG. 2A) and in a detailed view (FIG. 2B) according to the present disclosure.
Figure 2B:
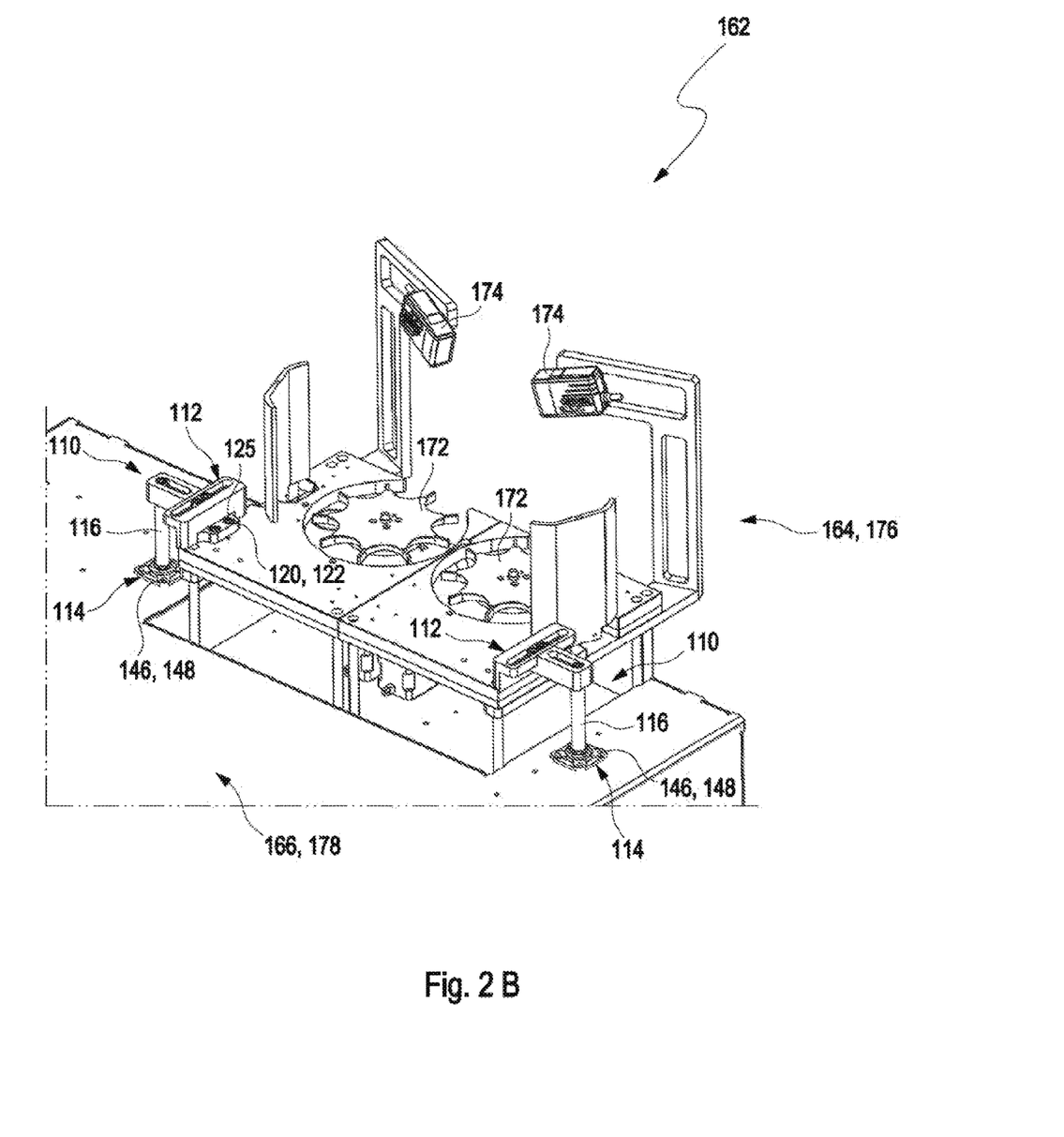

The connecting joint 110 comprises a horizontal bearing unit 112 connectable to a first component of the at least two components of the laboratory automation system. Further, the connecting joint 110 comprises a vertical bearing unit 114 connectable to a second component of the at least two components of the laboratory automation system. The first component, the second component and the laboratory automation system are not shown in FIGS. 1A to 1B. Reference is made to FIGS. 2A to 2B below. Further, the connecting joint 110 comprises a slider bar 116 connecting the horizontal bearing unit 112 with the vertical bearing unit 114. The slider bar 116 is movably mounted along a vertical axis 118 within the vertical bearing unit 114. The slider bar 116 is adjustably mounted in the horizontal bearing unit 112. The slider bar 116 is adjustable in at least one dimension essentially perpendicular to the vertical axis 118 by the horizontal bearing unit 112.

The horizontal bearing unit 112 may be fixedly connectable to the first component of the at least two components of the laboratory automation system. Specifically, the horizontal bearing unit 112 may comprise one or more connecting elements 120, specifically one or more through holes 122, as illustrated in FIG. 1A. The connecting elements 120 may be configured for fixedly connecting the horizontal bearing unit 112 to the first component. The horizontal bearing unit 112 may further comprise one or more screws 125. The horizontal bearing unit 112 may be configured to be screwed to the first component.

The horizontal bearing unit 112 may be configured for adjusting a position of the slider bar 116 in a horizontal plane. The horizontal plane may exemplarily extend along an axis x and an axis y which are arranged perpendicular to each other. Specifically, the horizontal bearing unit 112 may comprise at least one first part 124 having at least one first linear guide 126, typically at least one first elongated hole 128, and at least one second part 130 having at least one second linear guide 132, typically at least one second elongated hole 134. The first linear guide 126 may typically have a length $l_1$ of 15 mm. The second linear guide may typically have a length $l_2$ of 30 mm. The first part 124 and the second part 130 may be arranged essentially perpendicular to each other. Specifically, the first linear guide 126 and the second linear guide 128 may be arranged essentially perpendicular to each other.

The first part 124 and the second part 130 may be adjustably mounted on each other. Thus, a position of the first part 124 relative to the second 130 part may be adaptable. Specifically, the position of the first part 124 relative to the second part 130 may be adjustable along an axis 136 defined by the second linear guide 130. The first part 124 may be configured to be screwed to the second part 130 via two screws 138. The screws 138 may be received at least partially in the second linear guide 132 of the second part 130. In a first state, the screws 138 may be loosely screwed to the first part 124 and the first part 124 may be movable along the axis 136 defined by the second linear guide 130. In a second state, specifically when a desired position of the first part 124 and the second part 130 relative to each other is adjusted, the screws 138 may be screwed down such that a relative movement of the first part 124 to the second part 130 may be suppressed or at least reduced to a large extent.

The vertical bearing unit 114 may comprise at least one slide bearing 140. Specifically, the slide bearing 140 may comprise at least one bearing bore 142. The bearing bore 142 may be configured for partially receiving the slider bar 116. The bearing bore 142 may comprise at least one bearing surface 144, as illustrated in FIG. 1B. The bearing surface 144 may be configured for being in contact with the slider bar 116. The vertical bearing unit 114 may be fixedly connectable to the second component of the laboratory automation system (not shown in FIGS. 1A and 1B). Specifically, the vertical bearing unit 114 may comprise one or more connecting elements 146, specifically one or more eyelets 148, for fixedly connecting the vertical bearing unit 114 to the second component. The vertical bearing unit 114 may be configured to be screwed to the second component.

The slider bar 116 may comprise at least one cylindrically shaped portion 150, specifically at least one circular cylindrically shaped portion 152. Specifically, the cylindrically shaped portion 150 may be at least partially received in the vertical bearing unit 114. Further, the slider bar 116 may comprise at least one first end 154 and at least one opposing second end 156. At least one of the first end, the second end may be conically shaped.

The slider bar 116 may exemplarily have a length $l_3$ of 20 mm to 40 mm. Further, a distance d between the first part 124 of the horizontal bearing unit 112 and the vertical bearing unit 114 may exemplarily be 30 mm.

The slider bar 116 may form a mechanical coupling between the horizontal bearing unit 112 and the vertical bearing unit 114. Specifically, the slider bar 116 may be mechanically connectable to horizontal bearing unit 112. Further, the slider bar 116 may be mechanically connectable to the vertical bearing unit 114.

A position of the slider bar 116 relative to the first part 124 may be adjustable along an axis 158 defined by the first linear guide 126. The slider bar 116 may be configured to be screwed to the first part 124 of the horizontal bearing unit 112 via a screw 160. The screw 160 may be received at least partially in the first linear guide 126. In a first state, the screw 160 may be loosely screwed to the slider bar 116 and the slider bar 116 may be movable along the axis 158 defined by the first linear guide 126. In a second state, specifically when a desired position of the slider bar 116 and the first part 124 relative to each other is adjusted, the screw 160 may be screwed down, specifically such that a relative movement of the slider bar 116 to the first part 124 may be suppressed or at least reduced to a large extent. The second end 156 of the slider bar 116 unit may be partially received in the first linear guide 126, specifically in the first elongated hole 128.

FIGS. 2A and 2B show an exemplary embodiment of a laboratory automation system 162 in a perspective view (FIG. 2A) and in a detailed view (FIG. 2B).

The laboratory automation system 162 comprises a plurality of laboratory stations 164. In FIGS. 2A and 2B one laboratory station 164 is exemplarily shown. Further, the laboratory automation system 162 comprises at least one laboratory distribution system 166. The laboratory distribution system 166 is configured to distribute laboratory cargo between the laboratory stations 164. Further, the laboratory automation system comprises at least one connecting joint 110. The connecting joint 110 connects the laboratory station 164 to the laboratory distribution system 166. The connecting joint 110 as depicted in FIGS. 2A and 2B corresponds to the connecting joint 110 as depicted in FIGS. 1A and 1B. Thus, reference to the description of FIGS. 1A and 1B above is made.

The laboratory distribution system 166 may have a transport line (not shown in FIGS. 2A and 2B) configured for distributing laboratory cargo to a target destination within the laboratory automation system 162. Further, the laboratory distribution system 166 may have a plurality of racks and/or drawers (not shown in FIGS. 2A and 2B) for storing the laboratory cargo. In FIG. 2A an opening 168 configured for receiving the laboratory cargo is shown.

Typically, as illustrated in FIG. 2A, the laboratory automation system 162 comprises a plurality of adjustable feet 170 to compensate differences in height, which may specifically result from a sinking of the adjustable feet 170 into the ground. A further improvement of a horizontal alignment may be achieved by the connecting joints 110.

FIG. 2B shows a detailed view of the laboratory station 164. The laboratory station 164 is illustrated with two single sample carriers 172 and two camera modules 174.

The connecting joints 110 as illustrated in FIG. 2B adjustably connect the laboratory station 164, which may also be referred to as first component 176 of the laboratory automation system 162, and the laboratory distribution system 166, which may also be referred to as second component 178 of the laboratory automation system 162. The horizontal bearing unit 112 is connectable to the first component 176. Specifically, the horizontal bearing unit 112 may be fixedly connectable to the first component 176 via one or more connecting elements 120, specifically one or more through holes 122. The horizontal bearing unit 112 may further comprise the screws 124. The horizontal bearing unit 112 may be configured to be screwed to the first component 176. Further, the connecting joint 110 comprises the vertical bearing unit 114 connectable to the second component 178. The vertical bearing unit 114 may be fixedly connectable to the second component 178. Specifically, the vertical bearing unit 114 may comprise one or more of the connecting elements 146, specifically one or more eyelets 148, for fixedly connecting the vertical bearing unit 114 to the second component 178. The vertical bearing unit 114 may be configured to be screwed to the second component 178. The slider bar 116 connects the horizontal bearing unit 112 with the vertical bearing unit 114.

LIST OF REFERENCE NUMBERS 110 connecting joint
112 horizontal bearing unit
114 vertical bearing unit
116 slider bar
118 vertical axis
120 connecting element
122 through hole
124 first part
126 first linear guide
128 first elongated hole
130 second part
132 second linear guide
134 second elongated hole
136 axis
138 screw
140 slide bearing
142 bearing bore
144 bearing surface
146 connecting element
148 eyelet 150 cylindrically shaped portion
152 circular cylindrically shaped portion
154 first end
156 second end
158 axis
160 screw
162 laboratory automation system
164 laboratory station
166 laboratory distribution system
168 opening
170 adjustable foot
172 single sample carrier
174 camera module
176 first component
178 second component

What is claimed is:

1. A connecting joint for adjustably connecting at least two components of a laboratory automation system, the connecting joint comprising:
 a horizontal bearing unit connectable to a first component of the at least two components of the laboratory automation system;
 a vertical bearing unit connectable to a second component of the at least two components of the laboratory automation system wherein the first component is a laboratory station of the laboratory automation system and the second component is a laboratory distribution system of the laboratory automation system or wherein the first component is a laboratory distribution of the laboratory automation system and the second component is a laboratory station system of the laboratory automation system; and
 a slider bar connecting the horizontal bearing unit and the vertical bearing unit, wherein the slider bar is movably mounted along a vertical axis within the vertical bearing unit, the slider bar is adjustably mounted in the horizontal bearing unit, and the slider bar is adjustable in at least one dimension essentially perpendicular to the vertical axis by the horizontal bearing unit.

2. The connecting joint according to claim 1, wherein the slider bar is slidably mounted along the vertical axis within the vertical bearing unit.

3. The connecting joint according to claim 1, wherein the vertical bearing unit comprises at least one slide bearing, wherein the at least one slide bearing comprises at least one bearing bore, wherein the at least one bearing bore is configured to partially receive the slider bar.

4. The connecting joint according to claim 3, wherein the slider bar is slidably mounted in the at least one bearing bore of the at least one slide bearing.

5. The connecting joint according to claim 1, wherein the slider bar is fixedly mounted in an adjustable position in the at least one dimension essentially perpendicular to the vertical axis in the horizontal bearing unit.

6. The connecting joint according to claim 1, wherein the horizontal bearing unit comprises one or more connecting elements for fixedly connecting the horizontal bearing unit to the first component.

7. The connecting joint according to claim 1, wherein the horizontal bearing unit comprises at least one first part having at least one first linear guide and at least one second part having at least one second linear guide.

8. The connecting joint according to claim 7, wherein the at least one first part is arranged essentially perpendicularly to the at least one second part.

9. The connecting joint according to claim 7, wherein the at least one first part is adjustably mounted on the at least one second part.

10. The connecting joint according to claim 7, wherein a position of the at least one first part relative to the at least one second part is adjustable along an axis defined by the at least one second linear guide.

11. The connecting joint according to claim 7, wherein a position of the slider bar relative to the at least one first part is adjustable along an axis defined by the at least one first linear guide.

12. The connecting joint according to claim 7, wherein the slider bar includes an end partially received in the at least one first linear guide.

13. A laboratory automation system, comprising:
 a plurality of laboratory stations;
 at least one laboratory distribution system, wherein the at least one laboratory distribution system is configured to distribute laboratory cargo between the laboratory stations; and
 at least one connecting joint according to claim 1 connecting at least one of the laboratory stations to the laboratory distribution system.

14. The laboratory automation system according to claim 13, wherein one of the laboratory stations is connected to the laboratory distribution system via at least two connecting joints of the at least one connecting joint.

15. A method for adjustably connecting at least two components of a laboratory automation system, the method comprising the following steps:
 i. providing the connecting joint according to claim 1;
 ii. connecting the horizontal bearing unit of the connecting joint to the first component of the at least two components of the laboratory automation system; and
 iii. connecting the vertical bearing unit of the connecting joint to the second component of the at least two components of the laboratory automation system.

* * * * *